No. 46,513. PATENTED FEB. 21, 1865.
W. WEITLING.
DEVICE FOR EQUALIZING THE DELIVERY OF THREAD FROM SHUTTLES AND SPOOLS OF SEWING MACHINES.
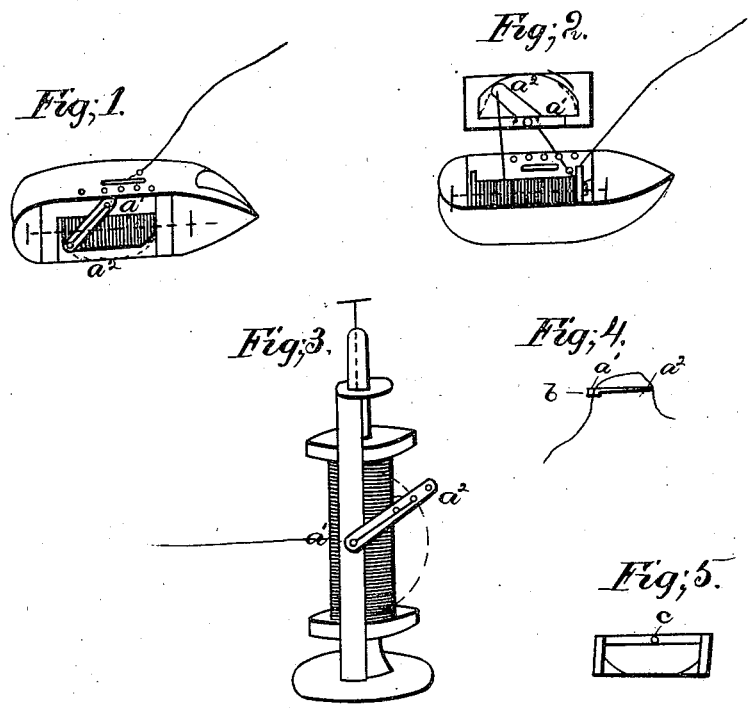
Witnesses;
Joseph Fukler
Augustus Merkle
Inventor;
William Weitling

UNITED STATES PATENT OFFICE.

WILLIAM WEITLING, OF NEW YORK, N. Y.

IMPROVEMENT IN DEVICES FOR EQUALIZING THE DELIVERY OF THREAD FROM SHUTTLES AND SPOOLS OF SEWING-MACHINES.

Specification forming part of Letters Patent No. 46,513, dated February 21, 1865.

*To all whom it may concern:*

Be it known that I, WILLIAM WEITLING, of New York, in the county and State of New York, have invented an Improvement in Devices for Equalizing the Delivery of Thread from Shuttles and Spools of Sewing-Machines, of which the following is a specification.

My invention relates to the application to the shuttle and also to the spool-standard of a sewing-machine of a tension-regulator, consisting of a thread-leader having eyes $a'$ $a^2$, as represented by Figures 1, 2, 3, and 4, and having a motion in the arc of a circle when acted on by the tension of the thread.

Figs. 1 and 2 represent its application to the shuttle, and Fig. 3 its application to the spool of a sewing-machine. Fig. 4 represents a sectional view of my leader, and Fig. 5 a view of the frame.

My thread-leader is provided with a tube, $b$, as represented by Fig. 4. This tube moves in the axle-box $c$, Fig. 5, when acted on by the tension of the thread. The axle-box $c$ is so placed in a frame and the frame so fastened to the shuttle-case or to the standard which supports the spool that the free end of my leader describes over the spool or the bobbin a segment the chord of which will correspond in position and length with the axis of the spool or the bobbin covered by thread. This tube $b$ constitutes the hollow axle of my leader, and by its hollow part, constituting also its tubular eye $a'$, it acts as a pivot or center for the leader, which is operated by the draft of the thread passing through its eyes. Eye $a'$ is connected with eye $a^2$ by a groove for the purpose of protecting the thread from friction between the leader and the race while passing from one eye to the other. From the spool or the bobbin the thread passes first through eye $a^2$. Thence it passes through the hollow axis $a'$ of the leader, and thence through one or more of the eyes generally used in sewing-machine shuttles. When unwinding, the tension of the thread acts on part $a^2$ of my leader and moves it in a curve along the length of the spool or bobbin, and alternately to the right and left, and draws the thread from the spool or bobbin in a line tangentially, or nearly so, to the circumference of the spool or bobbin.

My leader thus prevents the friction of the unwinding thread and regulates the tension by its own action.

Having thus fully, clearly, and exactly described my invention, what I claim herein as new, and desire to secure by Letters Patent, is—

The application to the spool or bobbin in a shuttle or other part of a sewing-machine of a thread-leader having a motion in the arc of a circle, and constructed and operated substantially in the manner and for the purpose described.

WILLIAM WEITLING.

Witnesses:
T. FICKLER,
AUGUSTUS MERKLE.